United States Patent
Baarman et al.

(10) Patent No.: US 7,355,150 B2
(45) Date of Patent: Apr. 8, 2008

(54) FOOD PREPARATION SYSTEM WITH INDUCTIVE POWER

(75) Inventors: David W. Baarman, Fennville, MI (US); John J. Lord, Springfield, IL (US); Nathan P. Stien, Peoria, IL (US); Wesley J. Bachman, Auburn, IL (US)

(73) Assignee: Access Business Group International LLC, Ada, MI (US)

( * ) Notice: Subject to any disclaimer, the term of this patent is extended or adjusted under 35 U.S.C. 154(b) by 83 days.

(21) Appl. No.: 11/388,142

(22) Filed: Mar. 23, 2006

(65) Prior Publication Data
US 2007/0221668 A1    Sep. 27, 2007

(51) Int. Cl.
*H05B 6/12* (2006.01)
*F24C 7/02* (2006.01)

(52) U.S. Cl. ............ 219/620; 219/626; 219/663; 219/665; 219/506; 99/451

(58) Field of Classification Search ........ 219/620–627, 219/663–668, 506, 518, 702, 714; 99/451, 99/325
See application file for complete search history.

(56) References Cited

U.S. PATENT DOCUMENTS

| | | | |
|---|---|---|---|
| 4,351,996 A | * | 9/1982 | Kondo et al. ............ 219/625 |
| 5,648,008 A | | 7/1997 | Barritt et al. |
| 6,080,975 A | | 6/2000 | Kuse et al. |
| 6,501,054 B2 | | 12/2002 | Engelmann et al. |
| 6,727,482 B2 | | 4/2004 | Bassill et al. |
| 2004/0149736 A1 | * | 8/2004 | Clothier ............ 219/627 |
| 2005/0067410 A1 | | 3/2005 | Ring |

FOREIGN PATENT DOCUMENTS

| | | | |
|---|---|---|---|
| JP | 6-20766 | * | 1/1994 |
| JP | 2002-75615 | * | 3/2002 |
| WO | 97-34518 | * | 9/1997 |

* cited by examiner

*Primary Examiner*—Philip H Leung
(74) *Attorney, Agent, or Firm*—Warner Norcross & Judd LLP

(57) ABSTRACT

A food preparation system includes a non-contact power supply for energizing a cooking appliance. The food preparation system includes a communication system for enabling communication between a food appliance and the system. The appliance transmits an identifier to the system. If the appliance does not have a transmitter, the system attempts to determine the type of appliance from a characterization of the power consumption by the appliance. If the appliance cannot be characterized, the food preparation system can be operated manually.

3 Claims, 6 Drawing Sheets

Note: Transitions shown without diamonds are based upon time delays.

FOOD PREPARATION SYSTEM WITH INDUCTIVE POWER

BACKGROUND OF THE INVENTION

Most kitchens have a plethora of appliances and devices for food preparation. For example, a kitchen may have a toaster, a coffee maker, a mixer, a blender, a food processor, and a stove. Most of these devices are or could be electric powered.

Often, these devices are used at different locations throughout the kitchen. The electric appliances must be located near outlets. Although greatest ergonomics is achieved if these appliances were used near the stove, the cords for these appliances generally must be kept away from the cooking surface of the stove.

The cords of these appliances also complicate the usability of these appliances. For example, a cord for a mixer must allow the cook to use the mixer in a variety of positions. If the cord is too long, the cord creates clutter in the kitchen, and reduces the available counter top space for food preparation.

The stove presents other challenges to kitchen ergonomics. Generally, the stove top can be used only for cooking. Thus, a segment of countertop space within a kitchen is unusable.

Some cooking surfaces have the heating element beneath a heat conductive material. While this does provide additional countertop space, the heat conductive material does provide some insulation, thereby reducing the overall efficiency of the stove. Due to the heating of the conductive material, some cooks find such a stove top difficult to use.

An improved method of providing power to the variety of appliances within a kitchen is therefore highly desirable.

SUMMARY OF THE INVENTION

A food preparation system includes a non-contact power transfer system for transferring power to a cooking appliance. A communication system allows information regarding a cooking appliance placed in proximity to the non-contact power transfer system to be provided to a control system. The control may send information to the cooking appliance. The non-contact power transfer system could be an inductive power system.

Using the information from the appliance, the control can determine the amount of energy to be transferred to the appliance in order for the appliance to achieve a desired result. For example, if the cooking appliance were a frying pan and it was desired for the pan to be heated to 250° F., the control calculates the energy required to heat the pan to the desired temperature as well as the time required for the frying pan to reach the desired temperature. If the frying pan included a temperature sensor, the frying pan would provide the temperature to the control, thereby allowing a closed loop control system for the frying pan.

In another embodiment, if the appliance did not have a communication system, the type of appliance could be detected by way of the frequency response profile for the appliance. The frequency response profile is a plot of the energy transferred to the appliance at different frequencies of operation by the non-contact power transfer system. To create the frequency response profile, the non-contact power transfer system is operated at many different frequencies. The energy transferred to the appliance is determined for each frequency. Each appliance has a unique frequency response profile, thereby allowing the appliance to be accurately identified. Once identified, information regarding the operation of the appliance is accessed from a database containing many different appliances.

If the appliance had a communication system, information regarding the operation of the appliance would be provided to the control by downloading information from the appliance to the control system. Alternatively, the appliance could provide an identifier to the control, and then the control would access information regarding the operation of the appliance from a memory.

The food preparation system may be connected to a network, allowing a user to provide control information to the food preparation system from a remote location. A user would then be able to provide precise control to various appliances in use with the food preparation system.

The food preparation system may also include alignment means such as a magnet to maintain the appliance in an acceptable position relative to the non-contact power system.

Various appliances could be used with the food preparation system. For example, an appliance could include a user interface for programming the operation of the appliance and the control system. Such an appliance includes a food container, a communication system, and a user input device. A user programs the operation of the appliance by entering specific cooking information such as temperature and time, or a user could select a preprogrammed cooking schedule.

Once entered, the appliance when placed in proximity to the non-contact power system would transfer the information regarding the cooking schedule to the control. The control would then power the appliance in accordance with the schedule.

Because energy is transferred to the appliance by way of a non-contact power system, a cooking appliance and control system could be fully sealed in a single unit. The entire appliance could then be immersed or place in a dish washer without worry of harming the control or the power connection.

A less complex appliance, such as a toaster, could also be used with the food preparation system. A toaster would include heating elements which would be inductively heated by the non-contact power system. A transmitter would provide information regarding the toaster to the control system.

These and other objects, advantages and features of the invention will be more readily understood and appreciated by reference to the detailed description of the drawings.

DETAILED DESCRIPTION OF THE DRAWINGS

Figure 1:
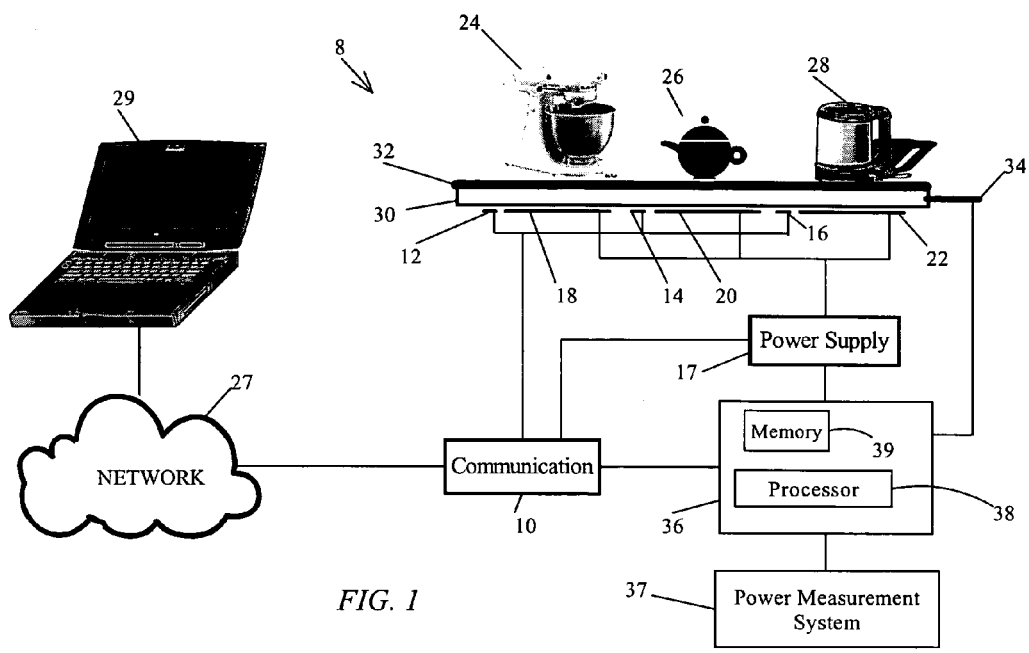
FIG. 1 shows a food preparation system.

FIG. 1 shows a food preparation system 8 for use within a kitchen. Communication interface 10 is attached to antennas 12, 14, 16. Communication system 10 is shown to be directly connected to antennas 12, 14, 16. Communication system 10 could be a wireless communication system using Blue Tooth, 802.11b, 802.11g or any other proprietary or open wireless communication protocol. Power supply 17 is connected to primary coils 18, 20, 22.

Power supply 17 preferable is an adaptive inductive power supply such as the one described in U.S. Pat. No. 6,825,620, issued Nov. 30, 2004 to Kuennen et al., the subject matter of which is incorporated in its entirety by reference. Primary coils 18, 20, 22 inductively couple to cooking utensils 24, 26, 28 in order to provide power to the utensils.

Cooking utensils 24, 26, 28 are powered by power supply 17 in cooperation with primary coils 18, 20, 22. Countertop 30 could be composed of any of the common materials used for kitchen countertops, such as Formica® or granite. If needed, insulating layer 32 may be used to provide thermal and electrical isolation of cooking utensils 24, 26, 28 from countertop 30. User interface 34 allows a user to input and view information from controller 36 to control the operation of food preparation system 8.

Countertop 30 or insulation layer 32 could include alignment means 43, 45, 47 further comprising electro or permanent magnets located near the center of each primary coil 18, 20, 22. Appliances 24, 26, 28 could include permanent magnets located near the center of each respective secondary, and oriented such that the secondary magnets serve to align the center of the appliance 24, 26, 28 secondary with the center of primary coil 18, 20, 22. Alternatively, alignment means 43, 44, 45 could be comprised of a visual indicator, such as a colored spot, an indentation, a raised section, a pin, or a recess.

Controller 36 includes processor 38 and memory 39. Processor 38 could be a microcontroller like the PIC30F3011, manufactured by Microchip, Inc., of Chandler, Ariz.

Power measurement system 37 could be a single phase bi-directional power/energy integrated circuit such as the CS5460A manufactured by Cirrus Logic of Austin, Tex. Power measurement system 37 measures the input voltage and current from an external power source. Controller 36 periodically polls power measurement system 37 to determine the power, current and voltage being supplied to food preparation system 8.

Controller 36 also monitors any devices drawing power from food preparation system 8 as well as controls the operation of power supply 18. Controller 36 also monitors the current supplied to primary coils 18, 20, 22.

Controller 36 also provides a safety shutoff. If the current supplied to any one of the primary coils 18, 20, 22 exceeds a threshold current, then power to the primary coils is reduced or eliminated.

Communication interface 10 could also be connected to network 27 and then to personal computer 29. A user could use personal computer 29 to access the operation of food preparation system 8.

Due to the possibility of a high electromagnetic field, controller 36 monitors the wireless output of communication interface 10. If the frequency of the output is not within the correct frequency region, the wireless communication is disabled. After a period of time, controller 36 would again attempt to establish a wireless communication link with any appliance.

Figure 2:
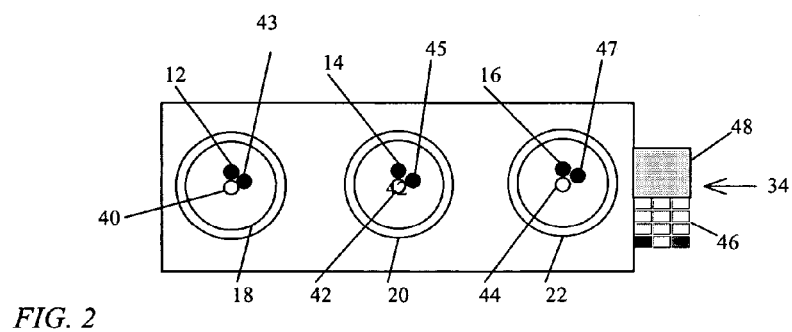
FIG. 2 is a top view of the food preparation system.

FIG. 2 is a top view of food preparation system 8 shown in FIG. 1. Temperature sensors 40, 42, 44 provide information regarding the temperature of the surface to control 34. Keypad 46 and display 48 allow the user to view information regarding cooking utensils 24, 26, 28. Additionally, keypad 46 allows the user to send commands to food preparation system 8. Magnets 43, 45, 47 assist in maintaining an appliance in alignment with coils 18, 20, 22.

Figure 3:
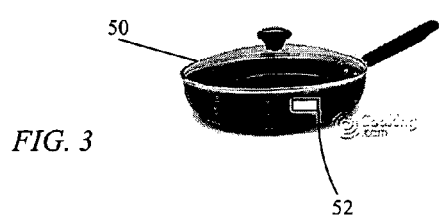
FIG. 3 shows an inductively powered appliance.

FIG. 3 shows a passive heating device for use with food preparation system 8. Devices for use with food preparation system 8 generally fall into three categories: passive heating devices; active heating devices; and electro-mechanical devices, such as blenders, mixers, electric can openers, and other electrical appliances.

Frying pan 50 is an example of a passive heating device. When placed near frying pan 50, a primary of food preparation system 8 when energized creates circulating currents within the base of frying pan 50, and thus heats the base of frying pan 50.

Controller 36 could identify frying pan 50 from the resonant frequency signature of frying pan 50. It has been found that each load has a slightly different frequency characterization. Processor 38 can use the information regarding the frequency response to retrieve information regarding the frying pan or any utensil. For example, processor 38 could provide to the user the manufacturer of frying pan and the various heating requirements for the frying pan.

Memory 39 could include information relating to the cooking characteristics of frying pan 50. For example, memory 39 could contain the heating curves for frying pan 50, identifying the current required of the primary to heat frying pan 50 to a temperature. This would allow a user to program a desired temperature for frying pan 50. Controller 36 would then determine the most efficient method to bring frying pan 50 to the desired temperature as well as to maintain frying pan 50 at the desired temperature. Such a sequence could involve providing power to frying pan 50 at different current levels and different frequencies over a period of time.

A temperature sensor could provide additional data to controller 36 to thus provide very fine control over the cooking temperature within frying pan 50. A user could enter a recipe or a temperature/time sequence by way of keypad 46 and display 48, and thus have the energy supplied to frying pan 50 vary over a cooking cycle.

Instead of detecting the resonant frequency of frying pan 50 to identify frying pan 50, frying pan 50 could include RFID tag 52. RFID tag 52 contains information identifying frying pan 50. RFID tag 52 could include an identifier. Processor 38 would look up information regarding frying pan 50 from memory 39. RFID tag 52 may contain specific information regarding the heating requirements of frying pan 50. If RFID tag 52 included specific information regarding the heating requirements of frying pan 50, then the information would be used directly by processor 38 to control the heating of frying pan 50. RFID tag 52 could be a transponder, a WIFI transmitter, or any other device for transmitting information to controller 36.

Figure 4:
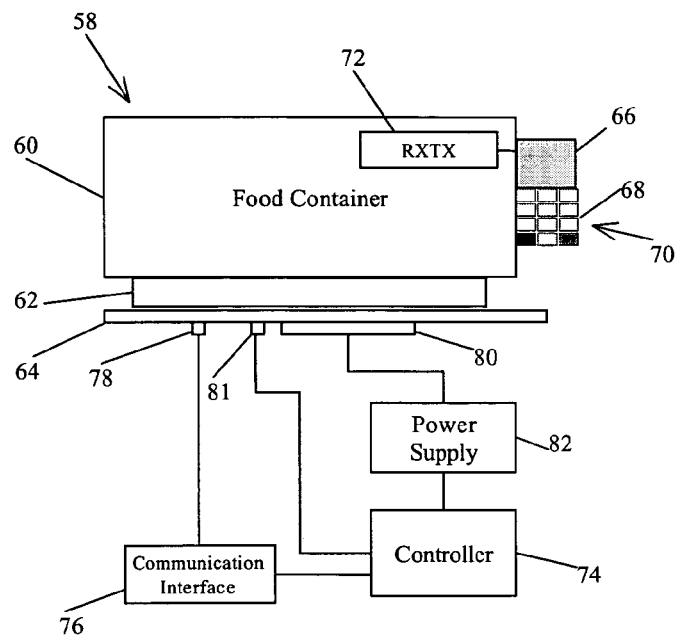
FIG. 4 shows an active cooking device.

FIG. 4 shows an active cooking device 58. Food container 60 is placed above and in contact with heating mass 62. Heating mass 62 is positioned near or on countertop 64. Device control 70 includes display 66 and keypad 68. Keypad 68 could be a series of switches or knobs. Device control 70 provides a way to monitor and control the temperature within food container 60. For example, display 66 could show the temperature within food container 60. Transceiver 72 provides two way communication between device control 70 and controller 74 by way of communication interface 76. Antenna 78 is located proximal to countertop 64 to facilitate communicate between transceiver 72 and communication interface 76. Temperature sensor 81 provides information regarding the surface temperature of countertop 64.

In operation, a user inputs the desired temperature or temperature schedule of food container 60 by way of device control 70. Device control 70 then sends information regarding the desired temperature and current temperature of food container 60 to controller 74 by way of transceiver 72. Controller 74 adjusts the power supplied by power supply 82 to primary 80, thus allowing accurate control of the temperature within food container 60.

Figure 5:
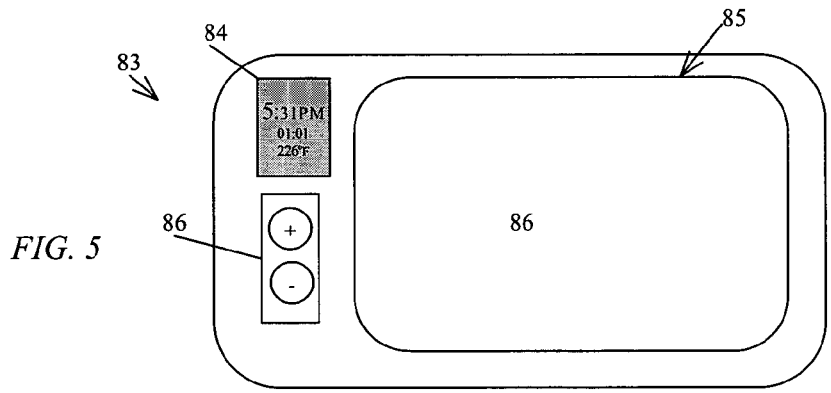
FIG. 5 shows an alternative embodiment of an active cooking device.

Various modifications of active cooking device 58 are possible. FIG. 5 shows one such version of cooking device 58. Cooking tray 83 has food area 85. Food can be placed within food area 85 for heating. A heating mass is located below food area 85. Display 84 could display date, time, elapsed time and temperature within food area 85. Device control 86 consists of a simple "up-down" switch for increasing or decreasing the temperature within food area 85.

Cooking tray 83 could be totally encapsulated in a moisture resistance material, thus allowing the cooking tray 83 to be fully immersible in water for cleaning. Additionally, the encapsulating material could allow cooking tray 83 to be placed within an oven or other baking device.

Figure 6:
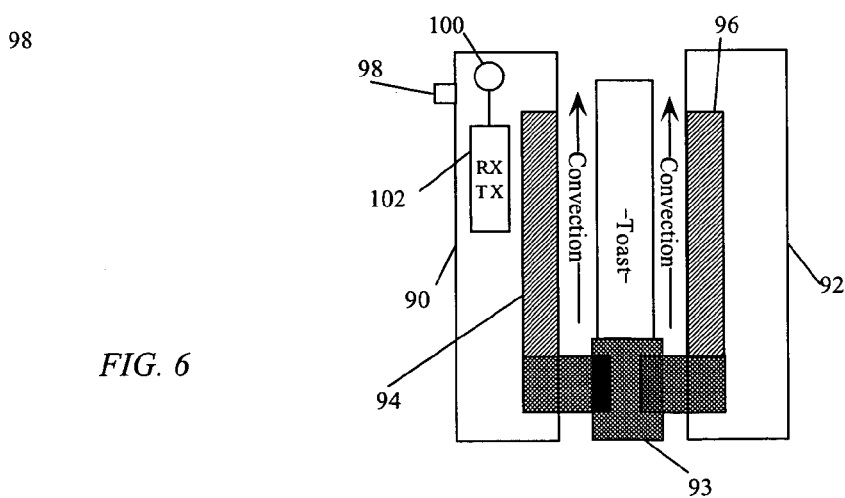
FIG. 6 shows an inductively powered toaster.

FIG. 6 shows a toaster for use with food preparation system 8. Sidewalls 90, 92 contain two heat conducting members 94, 96. Heating element 93 receives energy from the primary winding, and begins to heat, which causes heat conducting members 94, 96 to heat. Switch 98 allows the selection for the darkness of the bread by way of timer 100. Timer 100 is set to a predetermined length of time. When timer 100 expires, a signal is sent from transceiver 102 to turn off the primary winding.

Figure 6A:
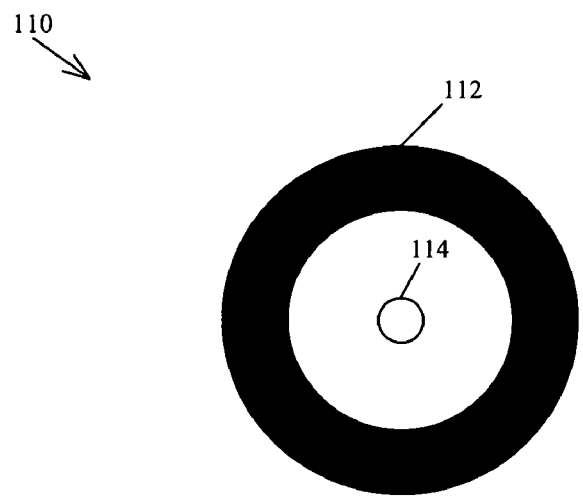
FIG. 6A shows an independent secondary heater for a cooking device.

FIG. 6A shows independent secondary heater 110 for the system for use with food preparation system 8. Independent secondary heater 110 allows for the use of non-magnetic pots and pans with food preparation system 8.

Independent secondary heater 110 includes a secondary section 112 and a scale section 114. Secondary section 112 is heated by way of a primary within food preparation system 8, and thereby can heat glass or other non-metallic cookware. The scale section is used to detect the weight of any items placed on independent secondary heater 110. Independent secondary heater 110 could include a transceiver for sending and receiving information to food preparation system 8.

Figure 7:
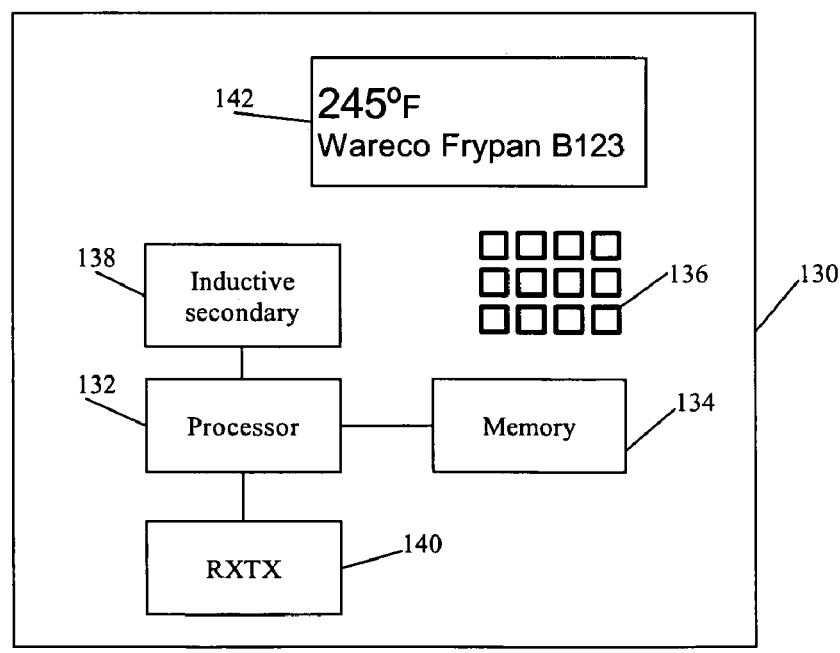
FIG. 7 shows an interface unit for an inductive cooking appliance

FIG. 7 shows interface unit 130 for an inductive cooking appliance. Interface unit 130 includes processor 132, memory 134, input device 136, inductive secondary 138, transceiver 140, and display 142. Interface unit 130 may be installed on an inductive cooking appliance or could be constructed as part of the inductive cooking appliance.

Input device 136 allows a user to enter an operating parameter, such as the desired temperature or motor speed, for an inductive cooking appliance. Input device 136 could be a keypad, dial, switch, or any other mechanism allowing for entry and control of the inductive cooking appliance.

Memory 134 contains an identifier for the cooking appliance as well as the operating parameters. Processor 132 by way of transceiver 140 provides instructions and information to processor 38 so that processor 38 can control the power provided to the respective primary coil. Processor 132 monitors the actual secondary coil voltage and the target voltage and requests changes in the frequency. The secondary coil voltage is observed at a rate of approximately 500K samples/sec. The sample rate could be more or less than 500K samples per second.

Memory 134 could also contain a profile for the cooking appliance, such as a heating profile. Thus, processor 132 could instruct processor 38 to provide sufficient power to rapidly heat the cooking appliance, and then reduce the power provided to the cooking appliance as the temperature of the cooking appliance approached the desired temperature.

Transceiver 140 could be use RFID, Bluetooth, WIFI, or any other wireless method to communicate information to processor 38. Processor 132 could be a PIC30F3010 microcontroller, also manufactured by Microchip, Inc., of Chandler, Ariz.

Figure 8:
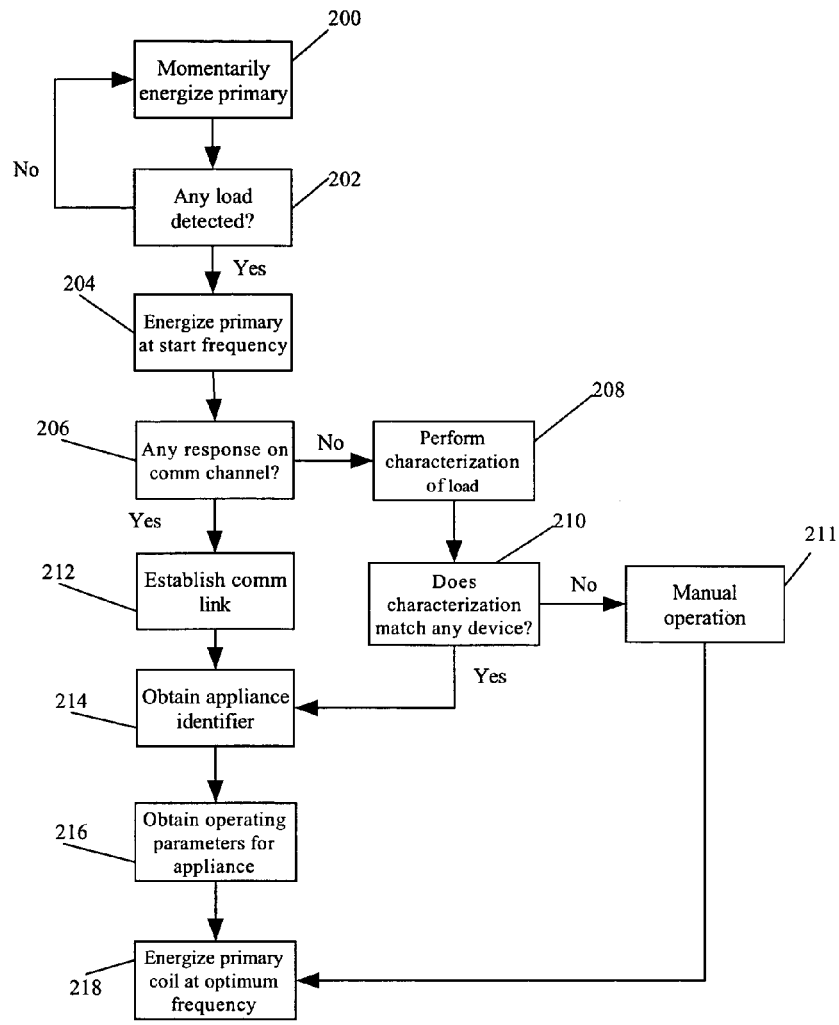
FIG. 8 shows a method for operating the inductive cooking system.

FIG. 8 shows a method for operating the inductive cooking system.

Inductive cooking system 8 periodically energizes each primary not in use. Step 200. Preferably, the primary is energized a probe frequency. The probe frequency preferably is not the resonant frequency of any inductive appliance.

The system then determines whether a load was detected by the probe frequency. Step 202. If no load was detected, the process of periodically providing power at a probe frequency continues.

If a load is present and if the system uses an adaptive inductive power supply, the frequency of the operation of the adaptive inductive power supply shifts from the probe frequency, thereby indicating to controller 36 that a load is present. If a load is detected, controller 36 then continually energizes the respective primary at a start frequency. Step 204.

The start frequency could be the same as the probe frequency or it could be a different frequency. The energization of the primary at the start frequency provides sufficient power to power any communication system on the cooking appliance, providing power to 138 inductive secondary and thereby to transceiver 140. When transceiver 140 is powered up, it begins transmitting information.

Inductive cooking system 8 then checks for any response from inductive appliance 130. Step 206.

Figure 9:
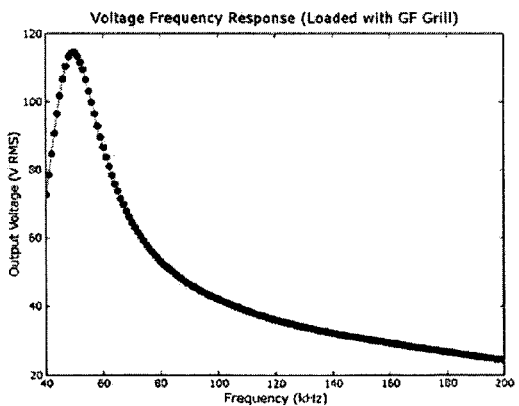
FIG. 9 shows a frequency profile for an inductively powered appliance.

If no response is received, inductive cooking system 8 then performs a characterization analysis of the device. Step 208. Characterization could consist of energizing the primary at a plurality of frequencies to obtain a frequency profile. A frequency profile is shown in FIG. 9.

In order to create a frequency profile, the frequency of the power supply is varied over a frequency range. The output voltage at each frequency is then determined. Each type of appliance has a unique frequency profile. Thus, by examining the frequency profile, the type of appliance placed into proximity to the food preparation system can be determined.

Returning to FIG. 8, after the appliance has been characterized, the system determines whether the device matches any known device. Step 210. If the characterization matches any known device, the identifier for that device is retrieved.

Step 214.

If the characterization does not match any device, the system operates in manual mode. Step 211. Manual mode allows a user manually adjusting the power supplied to the appliance by way of user interface 34.

If a response is received, then a communication link is established. Step 212. The appliance identifier is then obtained. Step 214.

The operating parameters for the device are obtained. Step 216. The power system then is energized in accordance with the operating parameters. Step 218.

Figure 10:
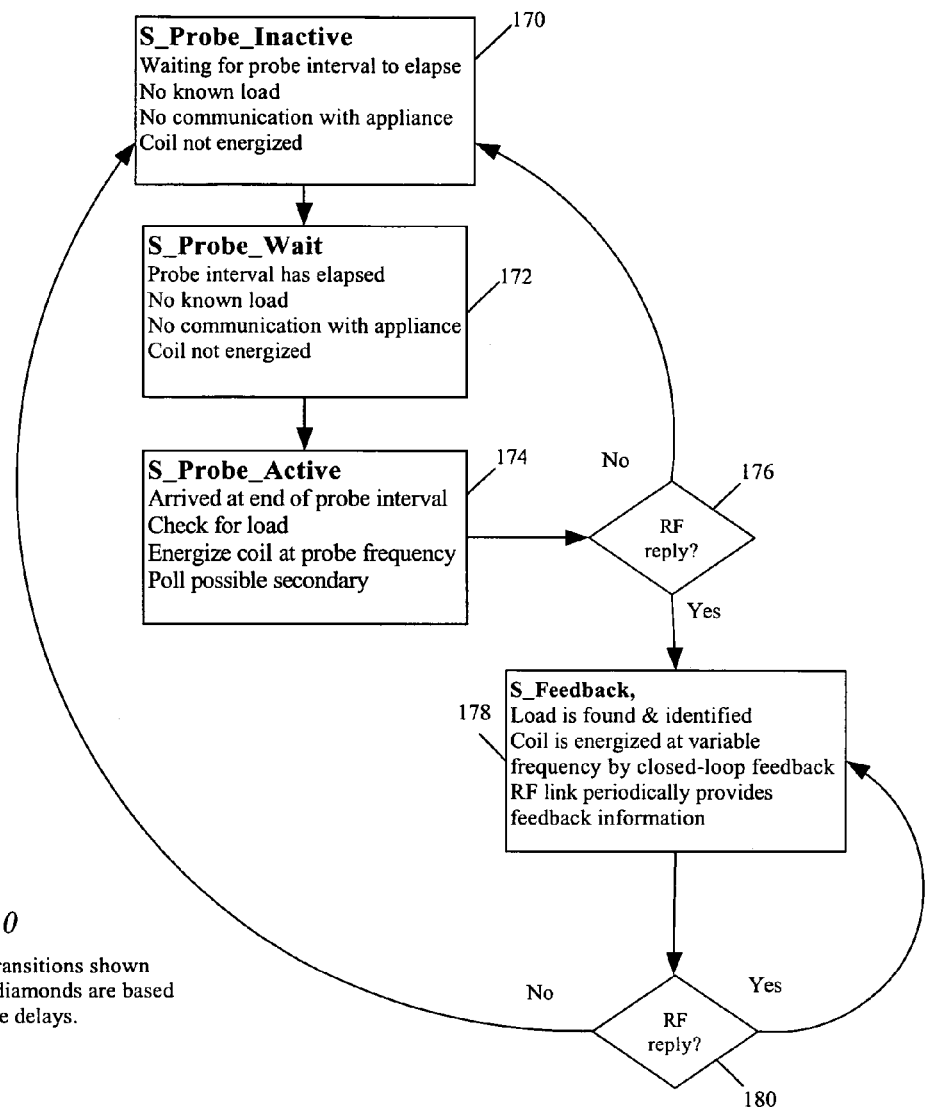
FIG. 10 is a state diagram for the inductive cooking system.

FIG. 10 is a state diagram for the controller 36 for one of primary coils 18, 20, 22 when an inductive appliance with a communication interface is used. During S_Probe_Inactive 170, the interval between probes has not elapsed. There is no known load and no communication with an external device. The coil is therefore not energized. S_Probe_Wait 172 occurs when the interval between probes has elapsed. There is no known load, the coil is not energized and there is no communication.

S_Probe_Active 174 occurs during the probe. Controller 36 is determining whether a load is present. The coil is energized at a probe frequency. A poll is sent by communication interface 10 to any appliance. If a return response is not received, the system returns to S_Probe_Inactive 170. If a reply is received, then the system progresses to S_Feedback 178. (See time delay 176).

In S_Feedback 178, a load is found and identified. The coil is energized as a variable frequency by a closed-loop feedback. The communication link provides periodic feedback to controller 36.

As shown by time delay 180, if a communication reply is not received during S_Feedback 178, then the system reverts to state S_Probe_Inactive 170.

Figure 11:
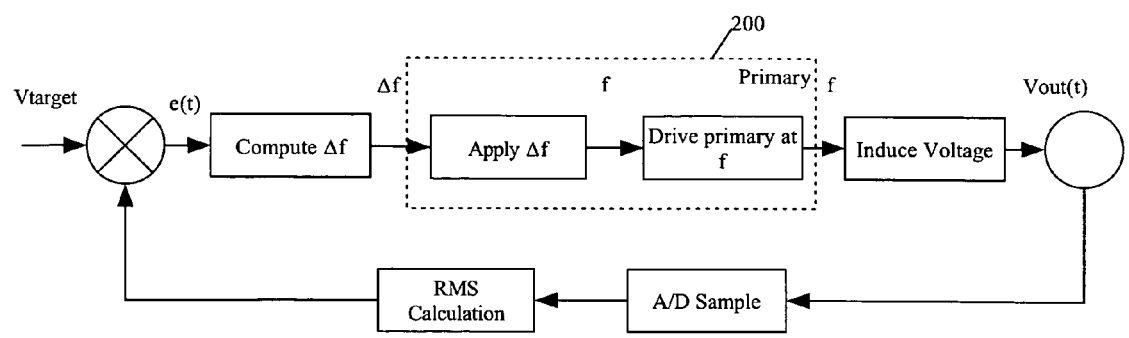
FIG. 11 shows the control algorithm for the system.

FIG. 11 shows the control algorithm for the system. All tasks except those within box 200 are performed by processor 132. The target voltage $V_{target}$ is compared with $V_{out}$. A frequency change ($\Delta f$) is computed and sent to controller 36. Controller 36 modifies the drive frequency, producing a different induced voltage $V_{out(t)}$. This then is fed back into the original input in order to complete the closed loop feedback system. Minor variations between $V_{target}$ and $V_{out}$ may be ignored.

The initial primary frequency could be any frequency. However, it has been found satisfactory to use the probe frequency. One suitable frequency is 80 KHz. Referring again to FIG. 9, a change in the frequency causes a change of the voltage induced in the secondary coil.

Before any changes in frequency occur, a small adjustment in frequency is made to determine whether the voltage slope is either positive or negative for the change in frequency. The slope indicates whether the frequency is increased or decreased in order to change the output voltage. For example, referring to FIG. 9, if the initial frequency of the primary were 50 KHz, an increase frequency would increase the output voltage, while a decrease in frequency would decrease the output voltage. However, if the initial frequency of the primary were 80 KHz, then a decrease in frequency would create an increase in output voltage, while an increase in frequency would produce a decrease in output voltage.

In some situations, a particular inductive appliance may have a frequency trough. A frequency trough is a minimum where the voltage output cannot be reduced by either increasing or decreasing the frequency. In this situation, after a predetermined number of attempts to change the voltage fail, the frequency of the primary is shifted by a predetermined amount to a new frequency. The predetermined amount of the frequency shift is sufficient to move the operating frequency from the frequency trough.

Generally, communication between controller 36 and any cooking utensil is commenced by controller 74 sending queries. The cooking utensils respond to the queries. Alternatively, the cooking utensils could broadcast information to controller 74.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A food preparation system for use with a food preparation appliance having an inductive secondary, the system comprising:
   a power supply including an inductive primary and being capable of driving the inductive primary at a plurality of frequencies;
   measuring means for measuring a response of the inductive secondary to each of the frequencies, the plurality of responses forming a frequency response profile;
   memory means for storing a plurality of appliance identifiers each associated with one of the frequency response profiles, the appliance identifiers including information regarding the use of the appliance; and
   a processor means operatively coupled to the power supply, the measuring means, and the memory means, the processor means being for compiling the frequency response profile, for selecting from the memory means the appliance identifier and the associated use information as a function of the frequency response profile, and for controlling the power supply in accordance with the associated use information.

2. The system of claim 1 further comprising an alignment means for retaining the food preparation appliance in alignment with the first inductive primary, the alignment means including a magnet.

3. The system of claim 1 wherein the means for measuring a response includes a means for measuring a voltage.

* * * * *